Figure 1:
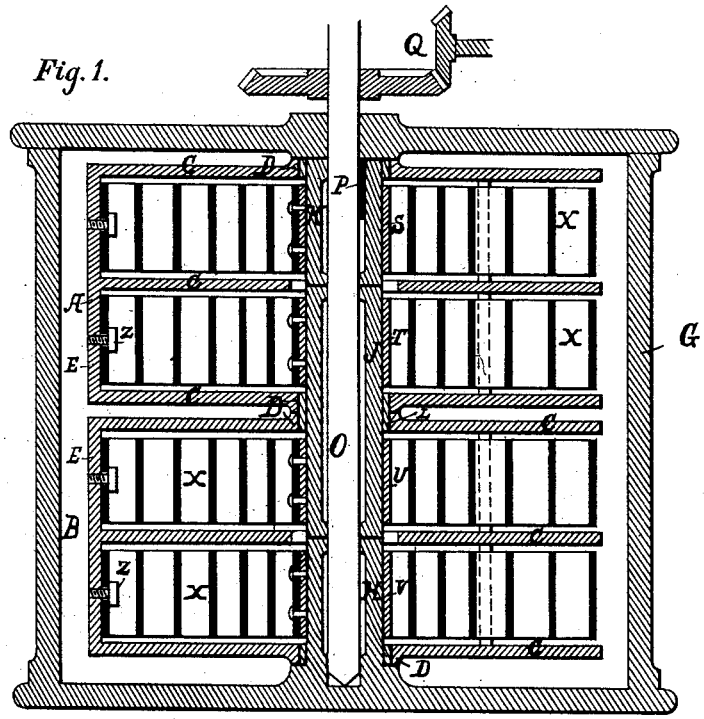

(No Model.)

C. FISHER.
SPRING MOTOR.

No. 244,990. Patented Aug. 2, 1881.

Witnesses:
C. B. Taylor
John Jolley

Inventor:
Clark Fisher
By his Attorneys
W. E. Strawbridge
J. Bonsall Taylor.

UNITED STATES PATENT OFFICE.

CLARK FISHER, OF TRENTON, NEW JERSEY.

SPRING-MOTOR.

SPECIFICATION forming part of Letters Patent No. 244,990, dated August 2, 1881.

Application filed May 23, 1881. (No model.)

*To all whom it may concern:*

Be it known that I, CLARK FISHER, of Trenton, New Jersey, have invented certain Improvements in Spring-Motors, of which the following is a specification.

My invention relates to that class of spring-motors in which a number of barrels, coiled band-springs, and shafts are so combined that the measure of power obtained from the whole of the springs is equivalent to that due to the recoil of one spring only, while the continuance of the power obtained is proportionate to the whole number of springs employed.

Motors embodying several separate springs incased in drums and revolving on a common axis, in lieu of one continuous spring whose length should be the aggregate of the length of the separate springs, are the invention of one John B. Howell, having been patented to him in and by Letters Patent No. 131,614, dated September 24, 1872, while motors embodying improvements upon the Howell device are the invention of one David Shive, and were patented to the Shive Governor Company, under date April 19, 1876, in and by Letters Patent No. 176,253, while certain improvements upon the Shive device were invented by one John B. Powell, and patented in and by Letters Patent No. 219,015, dated August 26, 1879.

The object of my invention is the improvement of the above-named patented devices in so far as relates to the method of attachment of the springs at their inner ends, to the diminution of friction, and to the securing of a true alignment in the revolving parts.

The above objects I attain by the employment of a single central shaft fitted with any given series of successively placed or juxtaposed spindles adapted to receive sleeves connected with the inner ends of the springs and adapted to revolve concentrically and independently thereupon, which shaft forms a common axis for all the spindles, in lieu of a series of separate solid shafts secured in line by pin-and-socket unions; by the employment of sleeves to which the inner ends of the springs are attached, adapted to be slid endwise onto the spindles, but so fitted as to be incapable of rotation thereon, in lieu of attaching the inner ends of the springs direct to the separate shafts; by the journaling of the webs constituting the barrels in such manner with respect to the spindles as to permit of the butting together of the spindles at their respective ends, and of the avoidance of pin-and-socket or kindred joints, whereby the motor is adapted to be operated with equal success whether placed in a vertical or in a horizontal position, in lieu of so journaling such parts that the motor can only be profitably operated in either a vertical or else in a horizontal position, but not in both positions, all substantially in the manner hereinafter described, and represented in the accompanying drawings, in which—

Figure 2:
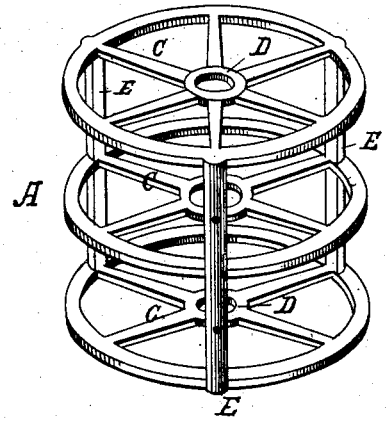
Figure 3:
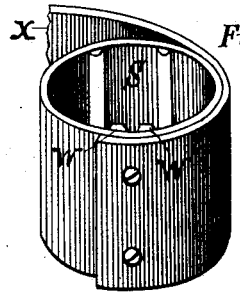
Figure 5:
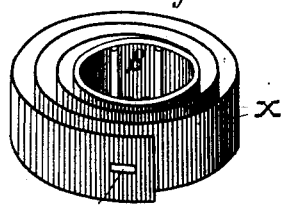
Figure 4:
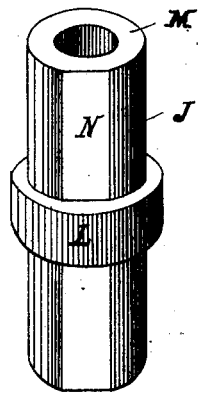
Figure 6:
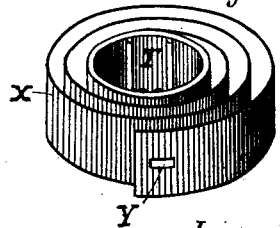

Figure 1 is a vertical central sectional elevation of a motor conveniently embodying my improvements. Fig. 2 is a view, in perspective, showing a convenient construction of one of the barrels. Fig. 3 is a similar view of one of the hollow sleeves, through the medium of which I connect the inner ends of the springs to the spindles. Fig. 4 is a similar view of one of the spindles; and Figs. 5 and 6 are views, in perspective, representing two oppositely-coiled and neighboring springs, respectively attached to the respective sleeves, through the medium of which they are secured to their respective spindles.

Similar letters of reference indicate corresponding parts.

In the accompanying drawings I have for convenience represented a motor having but two barrels and four springs. It will of course, however, be understood that any number of barrels and springs may be employed by lengthening out the central shaft and supplying to it the requisite number of spindles and sleeves.

In the drawings, A B are two neighboring barrels, conveniently formed in the manner indicated in Fig. 2—that is to say, of three circular skeleton-webs, C, of which the two end webs have each a central bearing, D, whereby the barrels can rotate upon the spindles in the manner represented, while the central web is enlarged, so as not to form a bearing, and which three webs are preferably connected together by three sets of pillars, E, through the medium of screws, connecting-bolts, or kindred ties. This construction of the barrels enables the lateral introduction of the coiled springs between two of the pillars, and permits the end introduction in the course of construction or setting up of the apparatus, heretofore essential, to be dispensed with.

G is a frame-work, to which is permanently attached the lower half-spindle, H, which is thereby prevented from rotating in the winding up of the device, which frame-work may be of such form, either inclosed or skeleton, as to permit of the motor being placed either vertically or horizontally, and which forms the upper bearing, I, of the central shaft, whose lower bearing is within the lower half-spindle, H.

J and K are respectively the middle and upper spindles of the device represented. The middle spindle, J, which is the type of all spindles other than the end ones employed in a motor of any greater number of barrels than two, is conveniently made of the form represented in Fig. 4—that is to say, it is a hollow tube fitted to revolve upon the central shaft, provided upon each side of its center with a key-seat or flattened portion, N, extending in the direction of its length, and also provided with a central circular bearing, L, being preferably an applied collar, to constitute a journal-surface, upon which the adjoining end webs of the two barrels can revolve. This spindle is flat at both of its extremities, as indicated by the letter M.

Where but two barrels are employed, as in the device represented, but a single section of the exact character above described, and represented in Fig. 4, is employed, it being in such employment the middle section. Where, however, more than two barrels are employed all the spindles, excepting only the end or half spindle, (such as H and K,) are to be formed of the above or of an equivalent construction.

In the forms represented in the drawings the upper and lower half-spindles, H and K, are hollow tubes corresponding in exterior and interior diameter with the middle spindle, each provided with a flattened portion similar to the portion N, and with journal-surfaces, being preferably collars L, for such bearings of the webs of the barrels as revolve upon their respective exteriors, the upper spindle being free to revolve with the shaft, but the lower being affixed to the frame-work.

O is the central shaft—a stem of suitable length fitted within the hollow interiors of all the spindles, and adapted to retain them in axial alignment. To this shaft the upper half-spindle is securely affixed by means of a key, P, or the like fastening; and to it is also secured the gearing Q, by which the motor is wound for action. The shaft, as stated, finds one of its bearings in the frame-work at I, and the other within the lower half-spindle.

S, T, U, and V are four hollow sleeves, each in length less than half the length of the middle spindle, fitted to encircle the spindles, and so internally conformed, by means of interior longitudinal ribs W, or other formations corresponding to the key-seats of the spindles, as to adapt them to slide endwise upon the spindles, but to prevent them from revolving or turning thereupon. To these sleeves the inner extremities of the band-springs X are bolted, or otherwise conveniently affixed or secured, the outer extremities of the springs being affixed to the barrels by means of slots Y, cut therein, adapted to be secured by bolts Z screwing within the pillars of the barrels, and of such form as to pass through the slots when in one position, but to prevent the escape of the springs when turned at right angles to such position.

Heretofore, in devices of this class, great difficulty has been experienced in securing the springs to the shafts heretofore employed. By the employment of the sleeves described, this fastening of the springs can be effected with ease, the springs being simply bolted or otherwise conveniently secured or affixed to the sleeves, as is easy to do, and the sleeves being then simply slipped endwise upon the spindles in the setting up of the apparatus.

It is obvious that the friction of the barrels upon the spindles in the respective revolution of such parts is much less than that incident to the old forms of motor, by reason of the method of fitting employed, and also by reason of the fact that the employment of the shaft within hollow spindles enables the application of oil to the interior revolving surfaces; and, further, by reason of the fact that the spindles are fitted together flat or "butted," so to speak, at their meeting ends, instead of being fitted by means of pin-and-socket joints, as heretofore necessary in order to preserve even approximate alignment.

It will be understood that in lieu of forming the spindles with flattened key-seats they may be provided with a feather or spline, or other formation correspondent to a formation on the interior of the sleeves, and which will prevent the rotation of the latter.

A mechanic will readily understand that the upper half-spindle may be continued above the frame-work and connected with the gearing, while the lower half-spindle, in such case, may be arranged to run loosely on the shaft, the effect of such modified arrangement upon the winding up and running of the motor being the same as that due to the described and represented arrangement.

Having thus described my invention, I claim—

1. The combination, in a spring-motor, of a series of hollow spindles with a central shaft concentric therewith and forming a common axis upon which the spindles revolve, whereby said spindles are retained in axial alignment, substantially as set forth.

2. The combination, in a spring-motor, of a successive series of hollow spindles butted together at their meeting ends, each connected with a motor-spring and one affixed to the frame-work, with a central shaft concentric therewith rigidly connected with one of the spindles and forming a common axis for the spindles, whereby said spindles are both retained in axial alignment and adapted to be actuated for the winding of their springs, substantially as set forth.

3. The combination, in a spring-motor, of a series of spindles, having a common axis on a central shaft, with a series of barrels containing coiled springs, substantially as described.

4. In combination, in a spring-motor, a series of spindles upon a central shaft, a series of sleeves adapted to be slid endwise on said spindles, and so conformed to said spindles as to be incapable, after being slid on, of being rotated thereupon, and a series of springs secured to said sleeves, substantially as set forth.

5. As a new article of manufacture, a hollow spindle for a spring-motor, externally flattened in the line of its length, provided with a key-seat, feather, or spline, or otherwise so externally conformed as to adapt it to receive and retain from rotation one or more correspondingly-formed sleeves, and provided with a central journal-surface for the bearings of adjoining end webs of contiguous barrels, substantially as set forth.

6. In a spring-motor, the combination, with a series of spindles concentric with, fitted upon, and kept in alignment by a central shaft common to them all, of a series of sleeves fitted upon said spindles, to which the inner ends of the springs are connected, and one or more barrels journaled with the spindles and retaining the outer ends of the springs, substantially as set forth.

7. A spring-motor in which are combined the following elements, viz: one or more barrels containing springs, a series of sleeves, a series of spindles, and a central shaft, all arranged and operating substantially in the manner and for the purposes hereinbefore set forth.

In testimony whereof I have hereunto signed my name this 2d day of May, A. D. 1881.

CLARK FISHER.

In presence of—
J. BONSALL TAYLOR,
JOHN JOLLEY, Jr.